(12) United States Patent
Rehmat

(10) Patent No.: US 9,434,895 B1
(45) Date of Patent: Sep. 6, 2016

(54) COMMON PURPOSE APPARATUS FOR PHYSICAL AND CHEMICAL GAS-SOLID REACTIONS

(71) Applicant: Simple Approach Systems, Inc., Schaumberg, IL (US)

(72) Inventor: Amirali G. Rehmat, Darien, IL (US)

(73) Assignee: SIMPLE APPROACH SYSTEMS, INC., Schaumburg, IL (US)

( * ) Notice: Subject to any disclaimer, the term of this patent is extended or adjusted under 35 U.S.C. 154(b) by 0 days.

(21) Appl. No.: 14/632,559

(22) Filed: Feb. 26, 2015

(51) Int. Cl.
*F02C 6/00* (2006.01)
*C10J 3/00* (2006.01)
*C10J 3/82* (2006.01)
*F01K 7/16* (2006.01)
*F01K 23/18* (2006.01)
*F02C 3/04* (2006.01)

(52) U.S. Cl.
CPC ....... *C10J 3/005* (2013.01); *C10J 3/82* (2013.01); *F01K 7/16* (2013.01); *F01K 23/18* (2013.01); *F02C 3/04* (2013.01); *F02C 6/00* (2013.01); *C10J 2200/15* (2013.01); *C10J 2300/0956* (2013.01); *C10J 2300/0976* (2013.01); *C10J 2300/1606* (2013.01); *C10J 2300/1675* (2013.01); *F05D 2220/32* (2013.01); *F05D 2260/40* (2013.01)

(58) Field of Classification Search
CPC ............ C10J 3/005; C10J 3/82; F01K 7/16; F02C 3/04; F02C 6/00
USPC .................. 432/103–119; 60/39.182, 39.15, 60/39.464, 39.463, 39.78, 781
See application file for complete search history.

(56) References Cited

U.S. PATENT DOCUMENTS

| 4,209,292 | A | * | 6/1980 | Rossi | C21B 13/08 266/96 |
|---|---|---|---|---|---|
| 4,255,135 | A | * | 3/1981 | Grim | F27B 15/02 431/7 |
| 5,802,841 | A | * | 9/1998 | Maeda | F23R 3/005 60/39.182 |
| 2010/0156104 | A1 | * | 6/2010 | Bottinelli | C01B 3/12 290/52 |
| 2013/0119315 | A1 | | 5/2013 | Rehmat | |
| 2014/0202079 | A1 | | 7/2014 | Rehmat | |

* cited by examiner

*Primary Examiner* — Steven Sutherland
(74) *Attorney, Agent, or Firm* — Joseph Hyosuk Kim; JHK Law

(57) ABSTRACT

The present application discloses a common purpose apparatus for carrying out physical and chemical reactions of carbonaceous materials with oxygen bearing gases and preheated gases that is used for carrying out thermo chemical transformation of carbonaceous materials into gaseous and liquid fuels, and for combusting carbonaceous fuels and to recover energy there from, and for remediating hydrocarbon-contaminated materials, and further for producing biochars from biomass.

36 Claims, 5 Drawing Sheets

COMMON PURPOSE APPARATUS FOR PHYSICAL AND CHEMICAL GAS-SOLID REACTIONS

BACKGROUND OF THE INVENTION

1. Field of the Invention

This invention relates to the use and application of a common purpose apparatus that enables the physical and chemical processing as well as thermo chemical transformation of carbonaceous materials including but not limited to drying, pyrolysis, gasification, staged combustion, uniform combustion, destruction of hazardous contaminants, and the production of bio-char. The apparatus of this invention is able to process all types of solid, liquid, and gaseous carbonaceous materials including but not limited to agriculture and forestry products and wastes; solid, liquid, and gaseous industry wastes, municipal solid wastes; sewage sludge; coal; oil shale; petroleum refinery residues; and hazardous wastes processed individually or as mixtures without limitation on source of these materials and without limitations on their physical nature or physical characteristics.

2. General Background and State of the Art

The general background and the state of the art included in the applications US application publication numbers 2014/0202079, filed Jan. 22, 2013 and 2013/0119315, filed Jan. 3, 2013, are incorporated herein by reference and additional information is added in order to further distinguish the versatility of the present invention over the present art of physical and chemical processing of the carbonaceous materials as well as that of thermochemical transformation of carbonaceous materials.

The types of apparatus commonly employed for physical and chemical processing include fluidized bed reactors, entrained bed reactors, fixed bed reactors, moving bed reactors, and rotary kiln reactor. Each one of these present arts have limited applications with respect to physical and chemical processing and with respect to thermochemical transformation of carbonaceous materials because of their restrictive covenants with respect to the physical and chemical properties of the carbonaceous materials and as well as due to physical limitations of these types of apparatus themselves.

A fluidized bed apparatus, for example, has limited application for general purposes achieved by this patent since it has to be designed differently for each specific application of physical or chemical processing as well as for thermochemical transformation reactions for similar carbonaceous materials. The design has to be precise with respect to the application of drying, pyrolysis, gasification, or combustion and has then to remain restricted for that specific use or application. The design of the system is also dictated and then to remain restricted by the physical characteristics of the material being processed especially with respect to density, size, and uniformity of the individual particles of the material. Once designed for one application and one type of material, the apparatus has no flexibility with respect to changing of application or with respect to changing physical nature of the carbonaceous material being processed or with combining varied source carbonaceous materials of vastly different physical and chemical properties. For example, changing the application of carbonaceous material being processed for gasification to the application of combustion would require three to four times the original gas reactant which will increase to gas velocity in the fluidized bed beyond its limitation and thereby cause upset in the reactor resulting in incomplete or inadequate processing.

As another example, the entrained bed reactor is specifically designed to keep the carbonaceous material in the stream of gas, which is accomplished by making the carbonaceous material very small in size. The reactor is designed such that the mixture of gas and solid particles passing through the predetermined sized reactor remain in intimate contact and attain certain conversion of the carbonaceous material, be it gasification or combustion mode of application. A change in physical size of the carbonaceous material or a change in density of the carbonaceous material would completely alter the dynamics of the reactor and would no longer yield the intended results of the application. Larger particles and or denser particles will segregate since the prescribed velocity of the gas will no longer be able to carry the larger and heavier particles. Trying to adjust the gas velocity to accommodate the larger or the heavier particles will result in gas and solids spending lesser time inside the reactor and result in incomplete or inadequate processing of the carbonaceous material.

As another example, the downdraft reactor is sensitive to the density of the carbonaceous material being processed as well as to the uniformity of the said material. This reactor is also not easily adaptable to changing applications for example from gasification to combustion since the increased amount of reactant gases to accomplish combustion would generate pockets of hot spots within the reactor which will result in the agglomeration of materials and result in abortion of the operation.

Similarly, the conventional rotary kiln differs significantly from the present invention because of its limited applications. The conventional rotary kiln is suitable for conventional combustion of carbonaceous material. For combustion application, more than stoichiometric amount of oxidant is introduced simultaneously with the carbonaceous material to instantly combust volatile fraction as well as fixed carbon portion of the carbonaceous materials. However, when the same kiln reactor is used for gasification applications requiring reaction with sub-stoichiometric amounts of oxidant, the conversion results are dismal. This is because when the carbonaceous material and sub-stoichiometric amount of air are introduced into the kiln reactor simultaneously, the limited amount of oxidant prefers to react with the combustible gases that are generated first from the devolatalization of the carbonaceous material rather than with the remaining carbon in the partially reacted carbonaceous material. Hence, mere switching from combustion to gasification mode using conventional kiln reactor does not function optimally when used for both applications. In reality, industry has recognized that a conventional kiln is not suitable for carrying out the gasification of the carbonaceous materials.

In general all industries require many of the unit operations including drying, combustion, gasification, and hazardous waste treatment at one time or another. Good example of this is a chemical plant which may need to remediate soil after an oil spill and at times might find it advantageous to harness energy from the waste materials that it produces, both of which involve widely different unit operations that would normally require having at its site two different sets of apparatus. These two operations are contrasted by large range of operating conditions with regards to temperature, gas solid interactions, amount of gas handled, type of material handled, residence time requirements for complete destruction of organics, and the method by which the energy is ultimately recovered. Having to require different systems for each of these applications is neither practical nor cost effective. When myriads of such industries are considered requiring hundreds of different unit operations that at times require in short span physical, thermal, and thermo-chemical processing unit operations, there is clearly a need for a single common purpose apparatus that would operate and function within many of these contrasting ranges of operating conditions and requiring widely different operating results. The present invention clearly meets this demand.

In contrast to all the current arts, the present invention provides a versatile apparatus that accommodates multitude of physical and chemical processing of carbonaceous materials as well as thermo chemical transformation of carbonaceous materials. This is accomplished through systematic introduction of reactant gases into the reactor assembly that provides effective gas solid reactions within the prescribed unit operations for the application of drying, pyrolysis, gasification, staged combustion, uniform combustion, destruction of hazardous contaminants, and production of bio-char with freedom of instant interchangeability with respect to the application and without regard to physical properties and characteristics of the carbonaceous materials including size and density as well as without regard to their chemical compositions resulting from switching the source or combining the sources of the carbonaceous materials. The present invention also incorporates provision for additional thermal treatment of gaseous products of reactions from all applications and allows for handling of different gas volumes arising from different applications. In addition to gas distribution along the length of the reactor, the present invention also provides for gas-solid contacting along the circumference of the reactor wall to coincide with the position of solids along the circumference, which is mainly dictated by the changing speed of the rotation of the kiln reactor. The flexibility of the apparatus accorded by the present invention permits broad range of unit operations without limitation, and hence it will find use in broad range of industries including power generation, chemical and process industries, agriculture waste processing, and oil refining, as well for energy recovery from municipal solid and other types of wastes and for remediation of hazardous wastes.

SUMMARY OF THE INVENTION

It is an object of this invention is to provide a common purpose apparatus for carrying out physical and chemical processes as well as thermochemical transformation of carbonaceous materials including drying, pyrolysis, gasification, staged combustion, uniform combustion, thermal destruction of hazardous contaminants, and producing bio-chars.

It is another object of this invention to eliminate limitations of physical characteristics of carbonaceous materials during the physical and chemical processing as well as during the thermochemical transformation of the said materials.

It is yet another object of this invention to accommodate reaction conditions of the physical and chemical processing, and those of thermochemical transformation of carbonaceous materials without necessitating physical alteration of the apparatus.

It is yet another object of this invention to accommodate the processing of the mixtures of varied sources of said carbonaceous materials without necessitating physical alteration of the apparatus.

It is yet another object of this invention to utilize energy contained in the carbonaceous materials in the production of heat source, steam source, and the electricity source.

These objects are achieved in accordance with this invention described hereunder.

According to a preferred embodiment of the present invention, there is provided a common purpose apparatus for carrying out multitude of physical and chemical processing of gases with carbonaceous materials as well as thermo chemical transformation of all types of carbonaceous materials including drying, pyrolysis, gasification, staged combustion, uniform combustion, destruction of hazardous contaminants, and the production of bio-char.

The apparatus comprises a horizontal rotary kiln reaction vessel, also referred interchangeably as rotary kiln reactor, with ability to rotate at differing speeds and equipped with a port to introduce carbonaceous materials into the rotating reaction vessel; a stationary gas distributor assembly inside the rotating kiln reaction vessel capable of independently delivering multitude of gases and gaseous reactants in varying quantities into four or more sections along the inside of the rotating kiln reaction vessel in a manner to maximize the exposure of solid carbonaceous material to the incoming gases. The gases are introduced into the reactor through multiplicity of ports located on the gas distributor communicating with the inside of the rotating kiln. The port openings cover at least half of the circumference of the gas distributor pipe communicating with the inside of the rotary kiln reaction vessel. The locations and the opening of these ports are such that the exiting gases get directed towards the solid carbonaceous material residing along the wall of the rotating kiln reaction vessel normally covering only the fraction of the circumference of the kiln. The circumference of coverage by solids present in the kiln reaction vessel is a function of rotational speed of the rotary kiln; and hence an adjustable mechanism surrounding the gas distributor is provided to allow for such an adjustment on the circumferential openings of the gas ports on the gas distributor from outside of the reactor such that the said gases are directed at the solids. The circumference of the openings of the ports and the number of the ports of the gas distributor are adjusted such that the openings commensurate with the speed of the rotation of the rotary kiln to assure complete exposure of solids to the incoming gases. The apparatus also comprises an expanded reaction section, which follows the rotary kiln reaction vessel to function as secondary reactor. The secondary reaction vessel comprises its own provision for introduction of fuel, steam and oxidant. The apparatus of this invention further comprises a compartmentalized gas cooling and heat recovery unit, which also functions as liquid condenser. The heat recovered by gas cooling unit is transformed into steam and optionally into electricity using steam turbine. Additionally, the apparatus also comprises a gas cleaning unit and a burner capable of combusting fuel gas generated by the thermochemical transformation of the carbonaceous material. The hot gases from combustion of said gases are directed to the said gas cooling and gas recovery unit for raising more steam and making more electricity. Alternatively, the apparatus is also integrated with gas engine so that fuel gas generated from the thermochemical transformation of the carbonaceous material can be utilized directly for generating electricity. Integration of steam generation and or electricity production are merely for illustrative purposes of use of products generated from the gas solid reactions using the apparatus of this invention and are not to be construed as limiting. These products would find many other uses such as for production of liquid fuels and chemicals and all of these are included in this invention.

A provision in the form of outlet port is provided to remove solid residue from the rotary kiln reaction vessel.

The rotary kiln reaction vessel does not impose any limitation on the amount of gases that is introduced into the said vessel and it is not limited by the physical properties of the carbonaceous materials that are processed through the said vessel. Contrasting with fluidized bed apparatus, the amount of gases introduced bears no limitation to minimum amount of gases required to keep the solids in suspension or is necessary to carry the solids. The solid flow in the kiln reaction vessel is dependent upon the slope of the kiln vessel itself and the rotating speed of the said kiln vessel. The parameters that dictate the rate of flow of solids through the kiln reaction vessel and the parameters that dictate the amount of gases necessary for causing gas solid reactions are made independent of one another by the apparatus of this invention to attain the versatility of its claims. The amounts of gases entering the kiln reaction vessel bear invariably some relationship to the stoichiometric requirements unique to each of the specific unit operation. As will be evident from the examples cited in the later part, there is a significant variation in gas flows between various unit operations. The apparatus of the present invention accommodates all of these variations without necessitating any physical change in the apparatus or in its configuration.

In the same way, the apparatus of this invention also accommodates instantaneous intentional or unintentional changes in physical properties of the carbonaceous material including its size and density without affecting the object of the intended unit operations. Similarly, changes in the chemical composition of the carbonaceous material attained by the virtue of mixing the materials from variety of different sources also does not impact the object of the intended unit operations when it is conducted in the apparatus of this invention.

The apparatus of this invention incorporates all of the components and the respective processing units that are anticipated in the conduct of physical and chemical reactions between the carbonaceous material and the gases as well as thermo chemical transformation of carbonaceous materials including drying of carbonaceous materials, pyrolysis of the carbonaceous materials, gasification of carbonaceous materials, staged combustion of carbonaceous material, conventional combustion of the carbonaceous material, remediation of hazardous wastes and the production of bio-char. For each of these unit operations, these components and processing units are artfully employed as will be evident from the examples included in the later part of this invention.

The apparatus of this invention is critical in distributing gas inside of the rotating kiln reactor so that the carbonaceous material is exposed to the reactant gases according to the requirements of the unit operations. This will be more obvious in examples that follow.

In one aspect, the present invention directed to a common purpose apparatus for carrying out physical and chemical reactions of carbonaceous materials with oxygen bearing gases and preheated gases; for carrying out thermo chemical transformation of carbonaceous materials into gaseous and liquid fuels; for combusting carbonaceous fuels and to recover energy there from; for remediating hydrocarbon-contaminated materials; and for the producing bio-chars from the biomass.

In one aspect, the apparatus described above includes a feeder to introduce carbonaceous materials into a rotary kiln reactor, a horizontal rotary kiln reactor, a port for introducing carbonaceous material at the front end of the rotary kiln reactor, an exit port for the removal of solids at the far end of the rotary kiln reactor, a stationary gas distributor assembly positioned inside the rotary kiln reactor, a secondary reactor following the rotary kiln reactor, an apparatus for introducing oxygen-bearing gases into the gas distributor, an apparatus for controlling the direction of gas from the distributor, an apparatus for introducing water and liquid carbonaceous materials into the rotary kiln reactor, an apparatus for introducing fuel, steam, and oxygen-bearing gases into the secondary reactor, an indirect gas cooler for cooling the gases and for recovering heat from the gas being cooled in the form of steam, a liquid condensate collector to recover hydrocarbon liquids from gases, an apparatus in which gas is cleaned to remove particulates and agents of greenhouse gases, a burner for combusting combustible gases, a steam turbine to generate electricity from steam, and a gas turbine to utilize combustible gaseous product from the apparatus to generate electricity.

In the apparatus above, in one aspect, the rotary kiln dimensions may be such that its length is 3 to 8 times larger than its diameter.

In the apparatus above, in one aspect, the minimum solids residence time as calculated by the ratio of the weight of the material residing inside the rotating kiln to the weight of the material fed in unit time may lie between 10 minutes to 60 minutes.

In the apparatus above, in one aspect, the horizontal kiln may rotate to impart inertia to the carbonaceous material entering the reactor and thereby confining them onto the rotating walls of the said horizontal kiln.

In the apparatus above, in one aspect, the speed of rotation of the kiln reactor may vary between 0.01 revolutions per minute to 10 revolutions per minute.

In the apparatus above, in one aspect, the horizontal kiln reactor may maintain a downward slope between 5 degrees to 15 degrees, the point of exit of the solids material being located on the low end of the slope.

In the apparatus above, in one aspect, the gas distributor assembly may be tubular.

In the apparatus above, in one aspect, the gas assembly may be comprised of the inner tube and an outer tube.

In the apparatus above, in one aspect, the inner tube may constitute the gas distributor and the outer tube may constitute a control device to control direction of the gas introduced by the gas distributor.

In the apparatus above, in one aspect, the outer tube may be free to rotate over the inner tube.

In the apparatus above, in one aspect, the gas distributor may be divided into four or more horizontal sections by fixed partitions located inside the tubular pipe.

In the apparatus above, in one aspect, the gas distributor may be supplied with oxygen-bearing gases as well as preheated gases, the introduction of said gases may be controlled independently of one another.

In the apparatus above, in one aspect, the gas distributor may be provided with multiplicity of ports in communication with the inside of the said rotary kiln reactor, further optionally, the ports may cover one half of the circumference of the gas distributor, and further optionally, the ports on the distributor may be uniform with respect to diameter, and still further optionally, the ports on the distributor may be of differing sizes with respect to diameter.

In the apparatus above, in one aspect, the distributor may be positioned to communicate gas directly with the solids present on the wall of the rotary kiln reactor.

In the apparatus above, in one aspect, the stationary gas distributor assembly may be supported by stationary hoods of the rotating kiln reactor.

In the apparatus above, in one aspect, the gas distributor may be divided evenly into four of more sections.

In the apparatus above, in one aspect, the gas distributor may be divided unevenly.

In the apparatus above, in one aspect, the amount of gas flowing through each of the gas distributor section may vary from 0 to 100 percent of the total gas introduced into the rotary kiln reactor.

In the apparatus above, in one aspect, the direction of the discharge of the gas from the gas distributor may be controlled according to the rotation of the rotary kiln in order to fully communicate with altering position of the solids confined on the wall of the said rotary kiln reactor.

In the apparatus above, in one aspect, the direction of the gas flow from the gas distributor may be controlled by second tubular pipe surrounding the gas distributor pipe.

In the apparatus above, in one aspect, the outer pipe for gas control and inner pipe for gas distribution may be concentric.

In the apparatus above, in one aspect, the outer pipe of the gas distribution assembly may be cut along the entire length of the portion exposed to inside of the rotary kiln extending to one half of the circumference such that the cut out area completely exposes all the ports of the inner pipe comprising the gas distributor.

In the apparatus above, in one aspect, the position of the outer pipe may be controlled from outside of the kiln with rotation mechanism.

In the apparatus above, in one aspect, the secondary reactor may be fluidized bed, entrained bed, fixed bed, moving bed, cyclonic reactor, and rotating kiln reactor.

In the apparatus above, in one aspect, the secondary reactor may be catalytic or noncatalytic.

In the apparatus above, in one aspect, the fuel, air, and steam may be injected with multiciplity of gas entry ports into the secondary reactor.

In the apparatus above, in one aspect, the gas cooler may indirectly cool the gas with water.

In the apparatus above, in one aspect, the water is converted into steam, and optionally, steam may be converted into electricity.

In the apparatus above, in one aspect, the gas cooler may include two or more gas coolers.

In the apparatus above, in one aspect, the gas cooler may recover heat from gases emanating from the secondary reactor.

In the apparatus above, in one aspect, the cooled gases may be combusted by the burner.

In the apparatus above, in one aspect, the gas cooler recovers heat from the gas discharged from the burner, and further optionally, the burner may not be closely coupled with the gas coolers, or the burner may be closely coupled with the gas coolers.

In the apparatus above, in one aspect, the hydrocarbon liquids may be condensed in the gas coolers.

In the apparatus above, in one aspect, the cooled gases may be combusted in the gas engine to generate electricity.

These and other objects and features of this invention will be more readily understood and appreciated from the description and drawings contained herein.

DETAILED DESCRIPTION OF THE PREFERRED EMBODIMENTS

Figure 1:
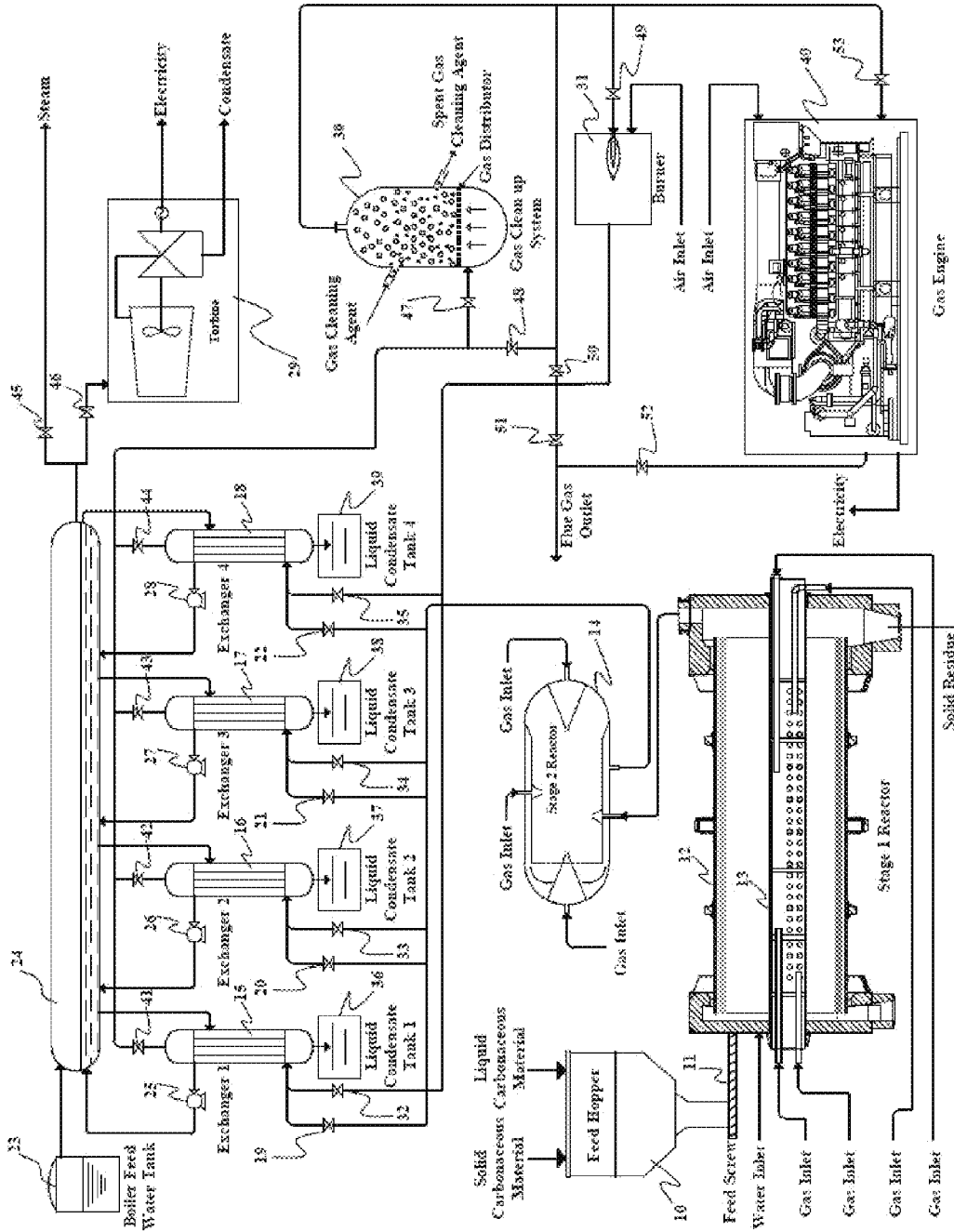
FIG. 1 shows a schematic of common purpose apparatus for physical and chemical reactions in accordance with one embodiment of this invention.

The common purpose apparatus for physical and chemical gas-solid reactions shown in FIG. 1 in accordance with one embodiment of this invention comprises of a system comprising of rotary kiln reactor 12, providing the first stage of all the possible gas-solid reactions in the said apparatus, and designed for yielding optimum gas-solid contacting of solid and liquid carbonaceous or solid non-carbonaceous materials stored in hopper 10 and conveyed into the rotary kiln reactor using solid conveyor 11 and oxygen-bearing and non-oxygen bearing gases entering the rotary kiln reactor via gas distributor 13 designed to deliver the incoming gases in varying quantities and compositions along the length of the rotary kiln and such that these gases are directed to make contact with the solids residing along the wall of the rotary kiln reactor. The contact of solids, liquids, and gases could cause amongst them mere physical interaction or chemical reactions to reshape the chemical composition of solids or thermochemical transformation to completely transform solids into gaseous and liquid forms. The apparatus is able to conduct all the unit operations between carbonaceous materials and the gases and to cause all of the physical and chemical reactions between the carbonaceous solids and gases including drying and devolatalization of carbonaceous materials, as well as thermo chemical transformation of solids to produce gaseous and liquid fuels, to remove and to destroy agents of organic contamination in inorganic materials including soils, and to produce bio-chars from biomasses without necessitating physical alteration to the apparatus. The said unit operations can be switched from one to the other instantaneously. Moreover, the apparatus operates independently with respect to the type of carbonaceous material, thereby enabling the carbonaceous material processed by the apparatus to vary with respect to its composition and physical properties without altering the anticipated results of the unit operations. The apparatus also operates independently with respect to the size of the carbonaceous material and therefore allows the size of the carbonaceous material to vary without altering the anticipated outcome of the unit operations. Although the apparatus would process carbonaceous material ranging from 0.1 inches to 6-inches, the preferred size for the embodiment is 0.1 to 2-inches. Similarly, the apparatus would permit passage of gas through the apparatus that is 40 times greater in weight that of the carbonaceous material being introduced into the rotary kiln reactor; however, the preferred flow in mass for the embodiment is 20 times that of the carbonaceous material. Similarly, the unit operations in the apparatus can be conducted at temperatures from 100 deg F. to 3000 deg F., the preferred range is 100 deg F. to 2200 deg F. Similarly, the preferred range of pressure inside the apparatus is minus 1 inch of water column to 100 inches of water column. The apparatus is useful for carrying out all of the unit operations that are known in the field of physical and chemical processing of the carbonaceous materials with gases as well as in the field of transformation of carbonaceous materials into the alternative fuels. The apparatus comprises of all the components that enables the conduct of all the possible unit operations between the carbonaceous materials and the gases. Not all of the components are necessary for all the unit operations and therefore only the pertinent components of the apparatus are utilized depending upon the unit operation carried out by the apparatus. The idle components, not utilized during particular unit operation, and which are simply bypassed, do not in any way impact the efficiency of the specific unit operation.

The gases and liquids generated from the gas-liquid-solids reactions in the primary kiln reactor 12 are directed to Stage 2 reactor 14 where additional physical and or chemical reactions are caused between gases and liquids by the addition of oxygen-bearing and non-oxygen bearing gases. The reaction temperature in Stage 2 reactor 14 is maintained between 200 deg F. to 2200 deg F. and the pressure in said reactor is maintained between 0.1 atmospheres to 70 atmospheres. The additional gas contact in said Stage 2 reactor with gases and liquids entering from rotary kiln reactor 12 is to further transform said liquids and gases into smaller gas molecules which are mainly gas. When no additional gases are introduced into Stage 2 reactor 14, the gases and liquids entering the said stage 2 reactor from rotary kiln reactor 12 would be identical. The gases from Stage 2 reactor 14 are subsequently directed to one or more heat recovery heat exchangers 25, 26, 27, and 28 to recover heat from the gases and liquids as well as to condense liquids present in the said gases.

The apparatus of this invention incorporates more than one heat recovery heat exchanger in order to accommodate large variation in the quantities of gases and liquids that the rotary kiln reactor 12 would generate during many possible physical and chemical interactions between the solids, liquids, and gases. For example gasification of biomass with air would generate only 30 to 40 percent of gas volume as compared with the combustion of the said biomass. The multiplicity of heat recovery heat exchangers system is designed to utilize one or several of these heat recovery exchangers to meet the requirement of specific gas-solid processing. The partitioning of the waste heat exchangers 15, 16, 17, and 18 are accomplished by the inlet shut off valves 19, 20, 21, and 22 and by the outlet shut off valves 41, 42, 43, and 44. The heat is recovered from the gases and liquids entering the heat recovery heat exchangers 15, 16, 17, and 18 by means of indirect contact with circulating water. For the circulation of water a common steam drum 24 acting as a water reservoir is provided above the heat recovery heat exchangers 15, 16, 17, and 18 from which water is circulated within these heat recovery heat exchangers using the gravity flow for the water into said heat exchangers and through forced circulation using the pumps 25, 26, 27, and 28 for the flow out of the exchangers into the steam drum 24. The heat transferred from the gases and liquids entering the heat recovery heat exchangers 15, 16, 17, and 18 to water circulating from steam drum 24 causes the water to evaporate and to convert into steam. The temperature of the gases and liquids entering the said heat recovery heat exchangers varies from 200 deg F. to 2200 deg F. The outlet temperature of gas leaving the heat recovery heat exchangers is maintained between 200 deg F. to 350 deg F. The steam produced in the steam drum 24 is utilized for utility purposes using the valve 45 or alternatively it is utilized in steam turbine to generate electricity with use of valve 46. When the gases and liquids entering the heat recovery heat exchangers 15, 16, 17, and 18 are cooled using indirect contact with circulating water, most of the hydrocarbon liquids present in the said entering stream are condensed and collected in condensate tanks 36, 37, 38, and 39. The gases and any uncondensed liquid emanating from the heat recovery heat exchangers 15, 16, 17, and 18 are subsequently directed to gas cleaning system 30 using valve 47 which is designed to remove particulates, oxides of sulfur, hydrogen sulfide, and trace metals from the gas stream entering it. If no gas cleaning is needed, the said gases are sent to the flue gas outlet using valve 51. If the said gases are cleansed using gas cleanup system 30, then the cleaned gas has an option to be discharged to flue gas outlet using valves 50 and 51 or sent to the burner using valve 31 or to the gas engine 40 using valve 53. The hot gas leaving the burner 31 can be directed to the bank of heat recovery heat exchangers using valves 32, 33, 34, and 35. The hot gases from gas engine 40 is discharged to the flue gas outlet using valve 52.

Figure 2:
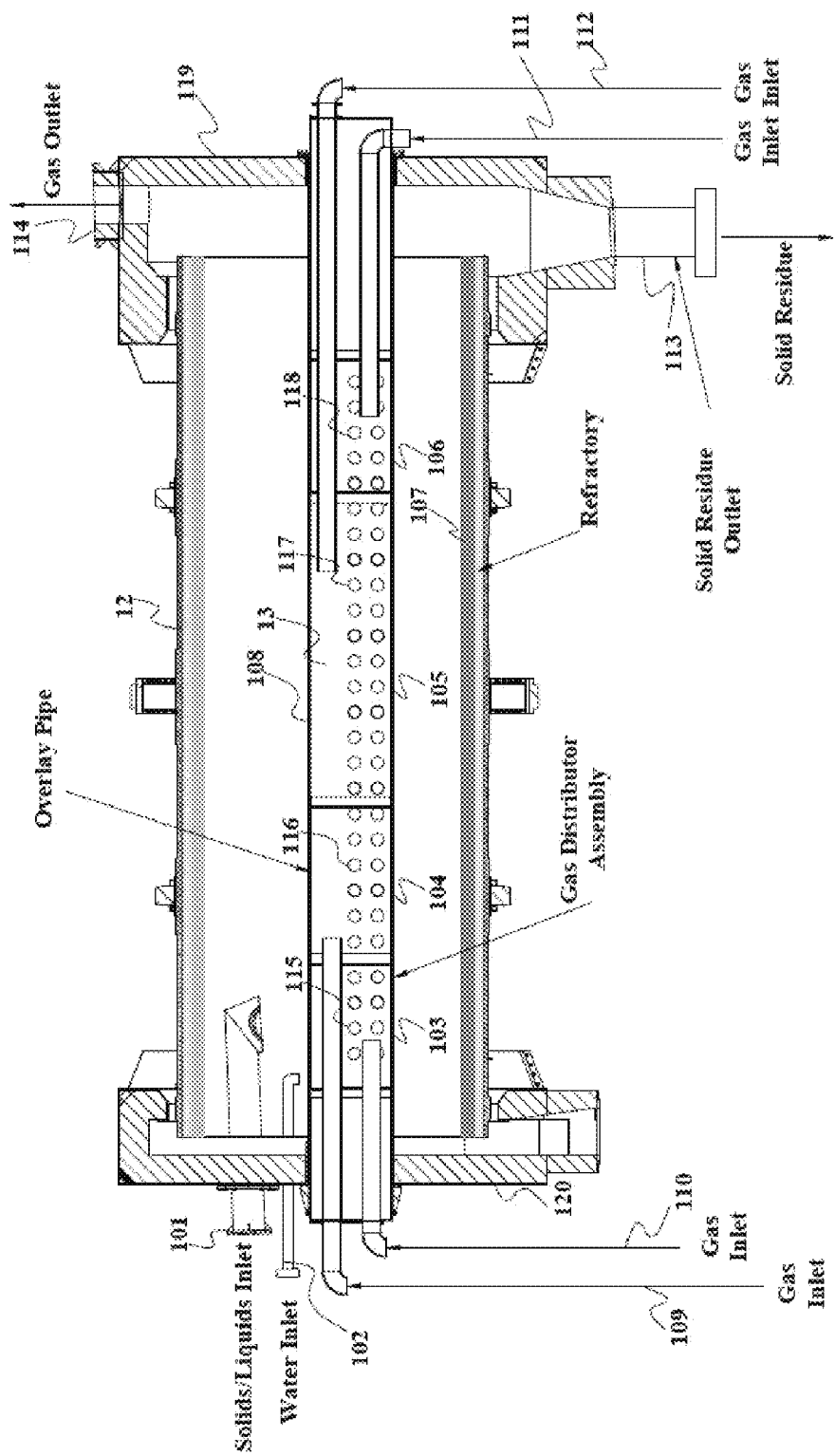
FIG. 2 shows the cross section of the rotary kiln reaction vessel and the stationary gas distributor inside of the said reaction vessel in accordance with another embodiment of this invention.

The details of the kiln reactor 12 are shown in FIG. 2. The said reactor comprises of a means of introducing hydrocarbon solids and liquids 101; a means of introducing water 102; a means of introducing gas into the said reactor using the gas distributor 13; a means of removing solids from the said kiln 113; and the means of removing gas from the said reactor 114. The gas distributor 13 is divided into four zones 103, 104, 105, and 106. The said four zones in FIG. 2 are for illustrative purposes only and not to be construed as limitation of the apparatus. The number of zones can vary from minimum of 2 to maximum of eight depending upon the length of the said reactor. Each zone of the gas distributor 13 comprises its own gas inlet 109, 110, 111, and 112 in order to allow for introducing gas with unique composition and unique quantity. The gas distributor 13 is a circular stationary pipe supported at each end of the kiln reactor 12 using stationary hoods 119 and 120. Each zone of the gas distributor comprises of multiplicity of gas outlet ports in order to introduce gas from the gas inlets 109, 110, 111, and 112 into the gasifier. The gas ports 115, 116, 117, and 118 can be identical or non identical and their numbers from zone to zone would depend on the maximum amount of gas to be introduced and the pressure at which the said gases are available. The said ports are drilled only along 180 degree of the circumference of the gas distributor 13. The gas distributor is fitted with a movable circular overlay pipe 108 which is capable of rotating from outside of the rotary kiln reactor 13 in order to direct the flow of gas from the port within the desired range of the inner periphery of the said reactor. The overlay pipe is circular and 180 degree of its circumference along the length of the gas distributor 13 that covers all the ports of the distributor 115, 116, 117, and 118 is removed so that the said ports are either exposed or remain hidden depending on the positioning of the overlay pipe. The inner surface of the rotary kiln reactor 13 is lined with refractory 107 so that the said reactor can be operated at temperature up to 2200 deg F. The metallurgy of the gas distributor 13 and overlay pipe 108 are selected to withstand temperature of up to 2200 deg F.

Figure 3:
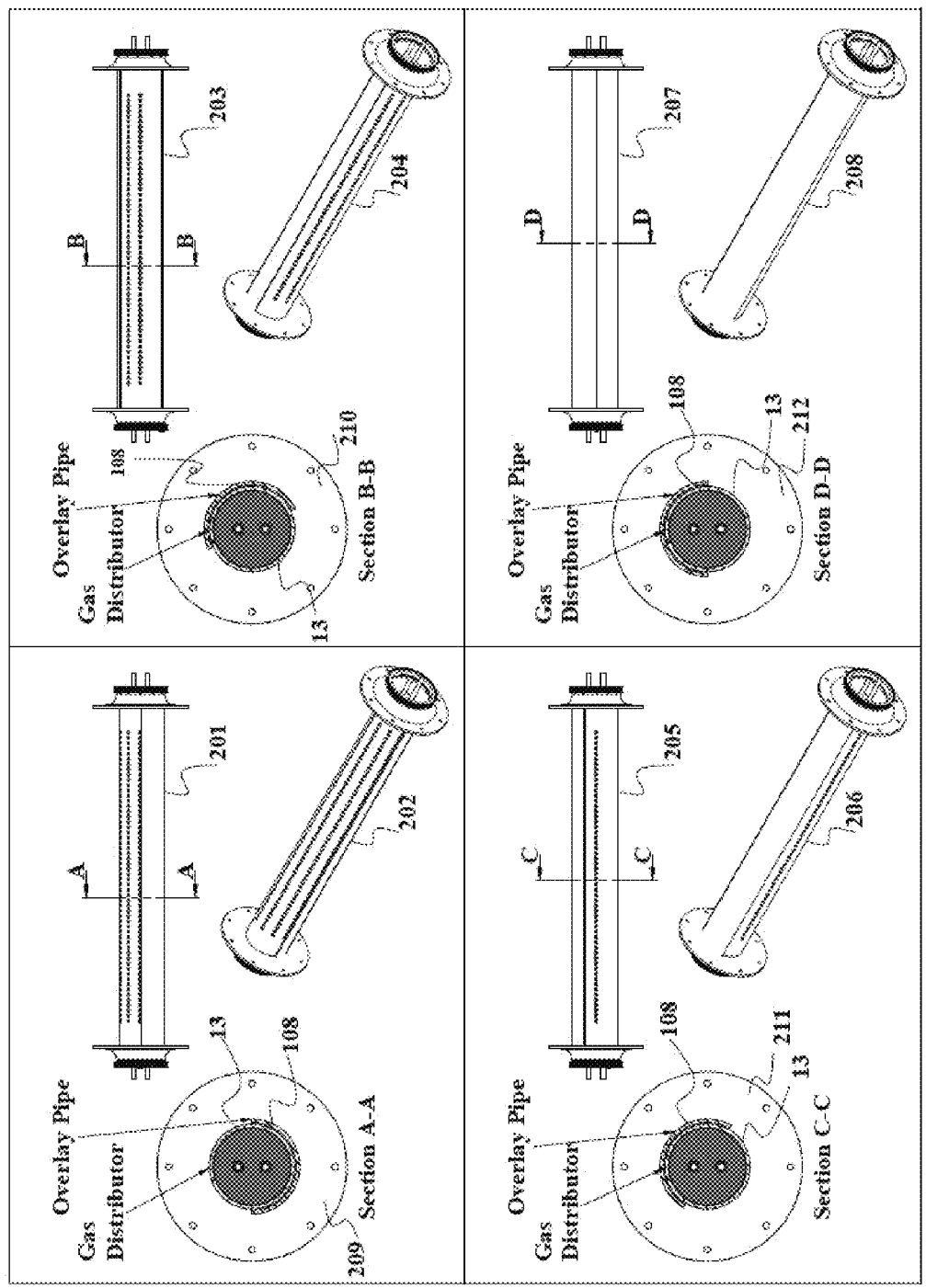
FIG. 3 shows the view of gas distributor and overlay pipe in accordance with yet another embodiment of this invention.

FIG. 3 illustrates relative positions of gas distributor 13 and overlay pipe 108 to indicate the utility of the present invention so that these relative positions make fraction of the ports available to commutate with the inside of the kiln reactor 12. In order to clarify the intent, four rows of port are shown within the 180 degree circumference along the length of the gas distributor 13. This limited illustration is not to be construed as the limitation of the invention. This invention permits unlimited means of distributing ports within the 180 degree circumference and along the length of the distributor 13. Moreover, these ports could assume pattern that are different from one another for each of the four zones 103, 104, 105, and 106 of the gas distributor 13. The views 201, 202, and 209 illustrate the relative positions of the gas distributor 13 and overlay pipe 108 when 100 percent of the gas outlet ports 115, 116, 117, and 118 are exposed to the interior of the kiln reactor 12. The views 203, 204, and 210 illustrate the relative positions of gas distributor 13 and overlay pipe 108 when 50 percent of the gas outlet ports 115, 116, 117, and 118 are exposed to the interior of the kiln 12. The views 205, 206, and 211 illustrate the relative positions of gas distributor 13 and overlay pipe 108 when 25 percent of the gas outlet ports 115, 116, 117, and 118 are exposed to the interior of the kiln 12. The views 207, 208, and 212 illustrate the relative positions of gas distributor 13 and overlay pipe 108 when zero percent of the gas outlet ports 115, 116, 117, and 118 are exposed to the interior of the kiln 12.

Figure 4:
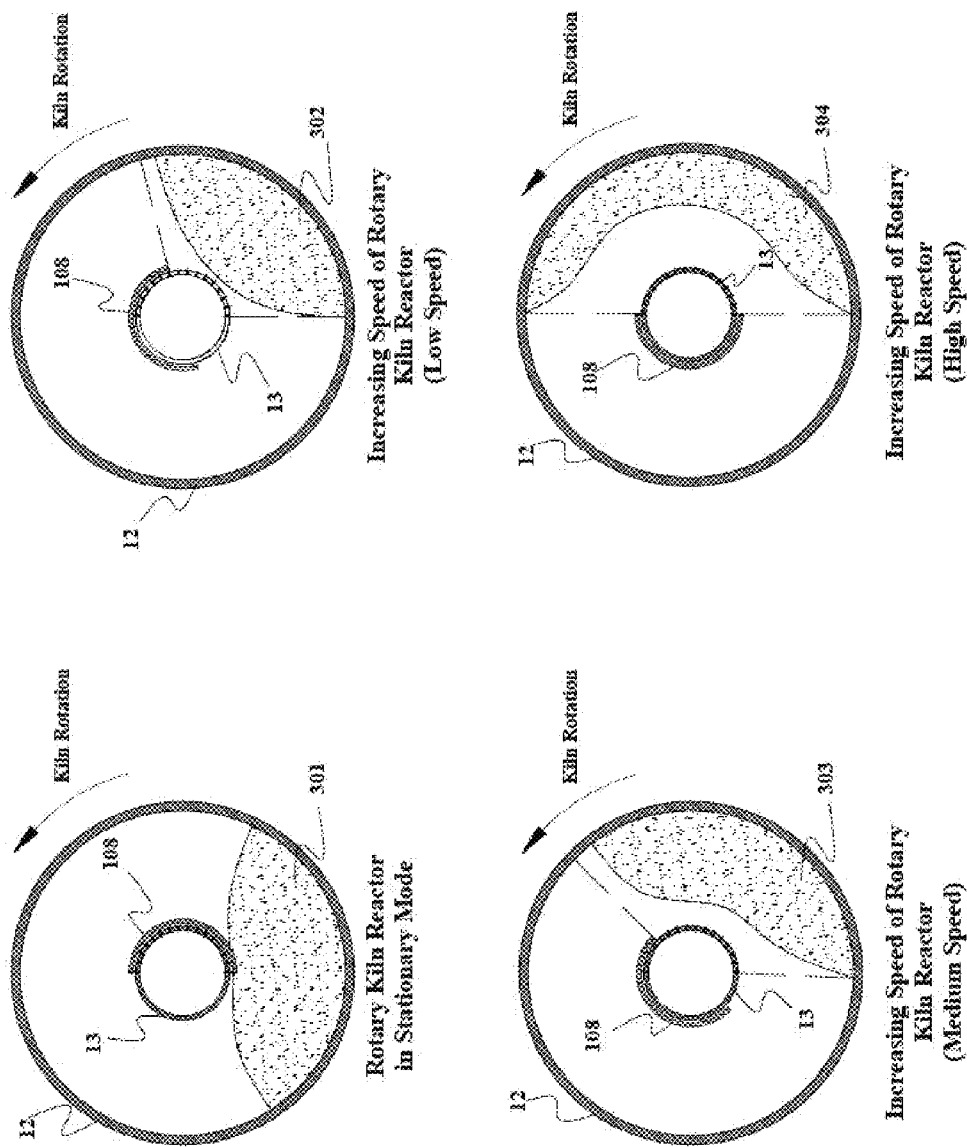
FIG. 4 shows gas distribution as a function of speed of rotation of the rotary kiln reactor in accordance with yet another embodiment of this invention.

FIG. 4 illustrates the utility of the present invention in terms of being able to direct the gas from ports 115, 116, 117, and 118 entering the interior of the kiln reactor 12 towards the solids residing in the kiln reactor. The description of FIG. 4 is for illustration of kiln reactor 12 operating in counter clockwise direction. This description is not to be construed as limiting to only this particular mode of rotation. The invention is equally applicable to clockwise rotation of the kiln reactor 12. After the hydrocarbon solids are introduced into the rotating kiln reactor 12 using inlet port 101, the inertial forces generated due to rotation gravitates the said solids towards the wall of the reactor along the length of the kiln reactor 12. The circumference of the coverage of the wall of the kiln reactor 12 depends on the speed of the rotation of the kiln reactor 12. In stationary mode, the solids settle at the bottom as indicated by solid distribution 301. As the speed of rotation is increased, the said solids are more disbursed along the wall and cover larger circumference of the wall of the kiln reactor 12. The relative solid distribution with increasing speed of rotation is indicated by solid distribution 302, 303, and 304 respectively. The present invention allows alteration of the relative positions of the gas distributor 13 and the overlay pipe 108 such that the trajectories of gas from ports 115, 116, 117, and 118 commutating with the interior of the kiln reactor 12 are directed to make maximum contact with the said solids and for the said gas trajectories to cover the corresponding circumference of the wall of the kiln reactor 12.

Figure 5:
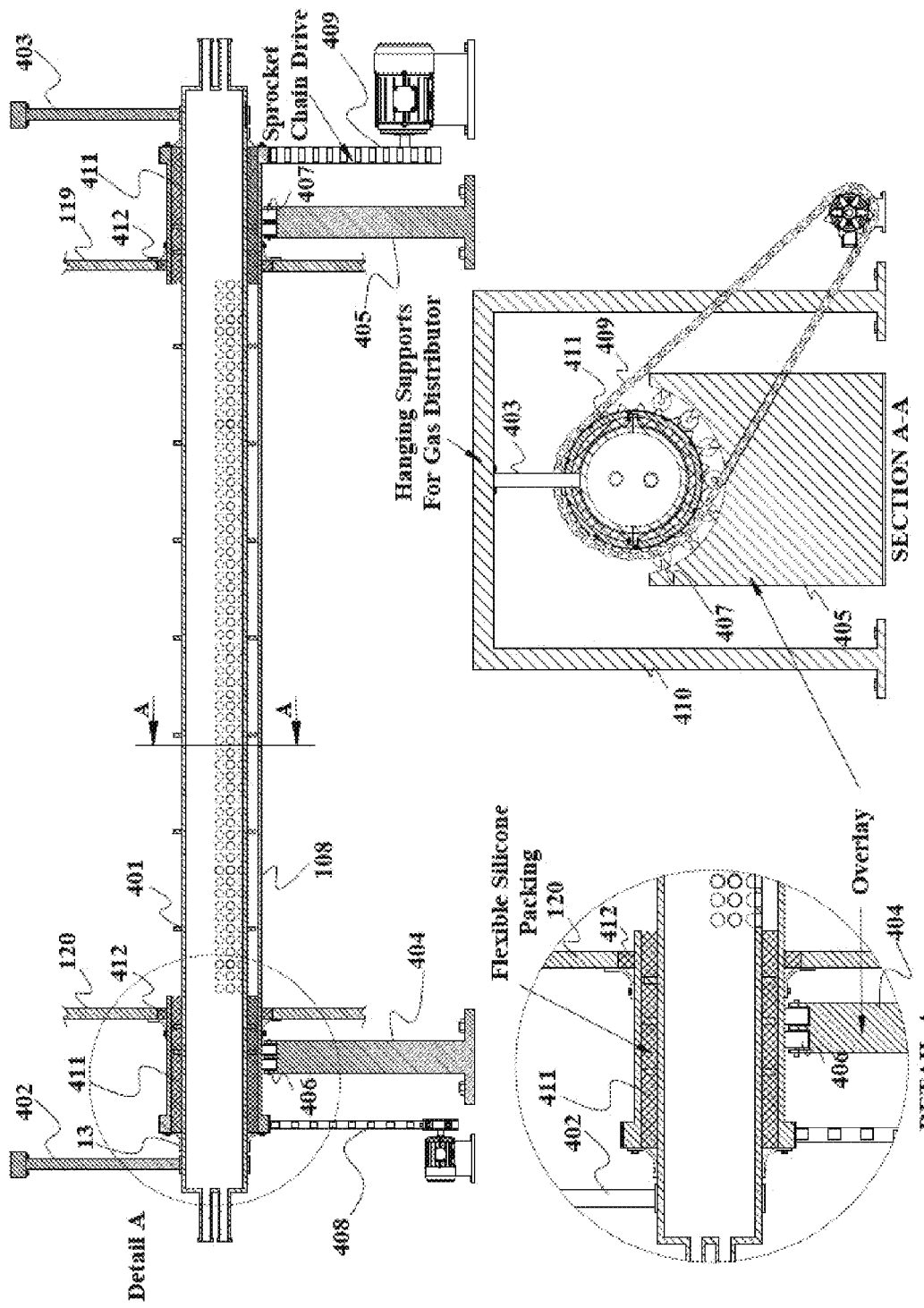
FIG. 5 shows gas distribution control device in accordance with yet another embodiment of this invention.

FIG. 5 is an illustration of mechanism by which the relative positions of the gas distributor 13 and overlay pipe 108 is adjusted from outside of the kiln reactor 12. The gas distributor 13 and the overlay pipes are separated from each other by using multiplicity of support rings 401 attached to the gas distributor 13 along the entire length of the gas distributor pipe. The said support rings 401 can be placed at equal distances or at random spacing. The design of the rings 401 is such that they allow free rotation of the overlay pipe 108 around the gas distributor pipe 13. The gas distributor pipe 13, the support rings 401, and overlay pipe are concentric. The said distributor pipe and the said overlay pipe are supported at the non-rotating hoods 119 and 120 of the kiln reactor. Both the said gas distributor pipe and the overlay pipe extend beyond the said hoods 119 and 120. The said gas distributor extends even farther than the said overlay pipe at both ends. The spacing 411 between the said gas distributor pipe and the said overlay pipe in the vicinity of the hoods 119 and 120 is filled with flexible silicone packing in order to avoid leakage of gas from within the kiln reactor 12 to the outside. Similarly, the gap 412 between the overlay pipe 108 and hoods 119 and 120 is also filled with the flexible silicone packing to avoid the leakage of gas from either kiln reactor 12 inside to the outside or vice versa from outside to the inside of the said kiln reactor. As illustrated in Detail A and Section A-A of FIG. 5, the gas distributor pipe 13 is supported with supports 402 and 403 from above. These overhead supports 402 and 403 are in turn supported by support frame, the example of which is illustrated by 410. The overlay pipe is supported at both ends by supports 404 and 405. These supports are furnished with rollers 406 and 407 so that the overlay pipe 108 is free to turn. The turning mechanism for the overlay pipe is provided by sprocket chain drives 408 and 409 at both ends of the said overlay pipe. The sprocket drives 408 and 409 operate in coordinated fashion in order to rotate the overlay pipe 108 without causing the stress in the said overlay pipe structure. Section A-A illustrates an expanded view of the sprocket chain drive 409 for clarity.

The apparatus of this invention is useful for conducting many of the industrial processing some of which are described here as illustrations. These illustrations are not to be construed as the limitation of the invention. The invention is useful for conducting vast number of industrial processing much beyond those illustrated here.

In utilizing the apparatus for the drying of the wet carbonaceous materials, the said carbonaceous material is introduced into the rotary kiln reactor 12 using conveyor 11 in FIG. 1 and solids inlet port 101 in FIG. 2. The unit operation for drying of the said carbonaceous material entails contacting moisture-laden solids with hot gases, which are introduced into the rotary kiln reactor 12 through the gas distributor 13 and more specifically using gas inlet pipes 109, 110, 111 and 112 shown in FIG. 2. The hot gases entering said gas inlet pipes 109, 110, 111, and 112 are maintained at 300 deg F. to 1000 deg F. The wet carbonaceous materials are introduced into the kiln reactor 12 at room temperature. Depending upon the speed of the rotation of the kiln reactor 12, the position of the overlay pipe 108 in FIG. 4, used for directing gas flow from ports 115, 116, 117, and 118 in FIG. 2 is adjusted using sprocket chain drives 408 and 409 in FIG. 5 so that the gas trajectories from the said gas ports adequately cover the solids layer 302, 303 or 304 shown in FIG. 4, as applicable. Best results for drying wet carbonaceous materials is attained when hot gases are uniformly distributed within the four zones 103, 104, 105, and 106 shown in FIG. 2 of gas distributor 13. During the contact of solids with the gas in the rotary kiln reactor 12, the heat is transferred from gases to the solids causing them to heat up to the temperature of 150 deg F. to 250 deg F. during which the moisture in the solids evaporate and convert into steam. The steam is discharged from the kiln reactor 12 with the other hot gases. The mixture of steam and hot gases exit the kiln reactor 12 at temperature between 180 deg F. and 230 deg F. These gases do not require any additional treatment in the stage 2 reactor 14 shown in FIG. 1 and therefore merely passes through it. Similarly, these gases do not require cooling and therefore merely passes through heat recovery heat exchangers 15, 16, 17, and 18 shown in FIG. 1. Upon entering gas cleanup system 30 shown in FIG. 1, the particulates are removed from the gas mixture and the clean gas is discharged to the flue gas outlet using 50 and 51 shown in FIG. 1. The reactions involved during the unit operation that entail drying of the wet carbonaceous materials are as follows:

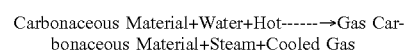
Carbonaceous Material+Water+Hot------→Gas Carbonaceous Material+Steam+Cooled Gas The dried carbonaceous solids are discharged from the kiln reactor 12 using solid residue outlet port 113, shown in FIG. 2.

The utility of the apparatus for carrying out the unit operation of the pyrolysis of the carbonaceous material entails heating of carbonaceous solids to the temperature in the range of 800 deg F. to 1000 deg F. in order to vaporize volatile matter present in the carbonaceous materials. The volatile matter evolved at this temperature comprises mainly of large molecule hydrocarbons, small molecule hydrocarbons, combustible gases including carbon monoxide and hydrogen, and non-combustible gases including carbon dioxide, nitrogen and water. In utilizing the apparatus for the pyrolysis of the carbonaceous materials, the said carbonaceous material is introduced into the rotary kiln reactor 12 using conveyor 11 in FIG. 1 and solids inlet port 101 in FIG. 2. The unit operation for pyrolysis of the said carbonaceous material entails contacting said carbonaceous solids with hot gases, which are introduced into the rotary kiln reactor 12 through the gas distributor 13 and more specifically using gas inlet pipes 109, 110, 111 and 112 shown in FIG. 2. One of the following two methods is utilized to increase the temperature of said carbonaceous material in order to evolve volatile matter contained in the said carbonaceous material.

The first method entails introduction of hot gases devoid of oxygen at 1200 deg F. to 3000 deg F. into the rotary kiln reactor 12 through the gas distributor 13 and more specifically using gas inlet pipes 109, 110, 111 and 112 shown in FIG. 2. The carbonaceous materials are introduced into the kiln reactor 12 at room temperature. Depending upon the speed of the rotation of the kiln reactor 12, the position of the overlay pipe 108 in FIG. 4, used for directing gas flow from ports 115, 116, 117, and 118 in FIG. 2 is adjusted using sprocket chain drives 408 and 409 in FIG. 5 so that the gas trajectories from the said gas ports adequately cover the solids layer 302, 303 or 304 shown in FIG. 4, as applicable. Best results for the pyrolysis of carbonaceous materials using this method is attained when hot gases are uniformly distributed within the four zones 103, 104, 105, and 106 shown in FIG. 2 of gas distributor 13. During the contact of solids with the gas in the rotary kiln reactor 12, the heat is transferred from gases to the solids causing them to heat up to the temperature of 800 deg F. to 1000 deg F. during which the volatiles present in the said carbonaceous materials devolatalize and convert into stream of hot gases at 1000 deg F. to 1200 deg F.

For unit operations involving pyrolysis of carbonaceous material, the gas mixture produced in the kiln reactor 12 does not require any additional treatment in the stage 2 reactor 14 and therefore the said gases are allowed to merely pass through the said stage 2 reactor. Upon entering the heat recovery heat exchangers 15, 16, 17, and 18 shown in FIG. 1, the said gases are cooled by indirect contact with water to 300 deg F. causing the large molecules of hydrocarbons present in the said gases to condense and collected in the condensate tanks 36, 37, 38, and/or 39 as applicable depending upon the number of heat recovery heat exchangers are deployed for cooling of the said hot gases from the kiln reactor 12. Depending upon the quantity of hot gases generated in kiln reactor 12, only one or two of the said heat recovery heat exchangers would be utilized when the apparatus is used for the pyrolysis of the carbonaceous material. The recovered heat is transformed into steam, which in turn is utilized for utility or for generating electricity using steam turbine 29. The remainder of the gas mixture leaving the said heat recovery heat exchangers, comprising of small molecules of hydrocarbon, combustible gases, and non-combustible gases, are directed to the gas cleanup system 30 to remove particulates and precursors of greenhouse gases before it is combusted in burner 31. The hot gases from said burner are directed to the remaining of the said heat recovery heat exchangers 15, 16, 17 and/or 18 to recover energy in the form of the steam. The cooled gases are discharged to the flue gas outlet conduit.

The reactions involved during the unit operations involving the pyrolysis of the carbonaceous materials are as follows:

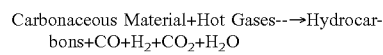

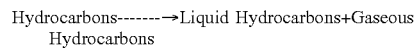

The second method entails partial combustion of carbonaceous materials to generate adequate heat to raise the temperature of the said carbonaceous materials to 800 deg F. to 1000 deg F. The carbonaceous material is introduced into the kiln reactor 12 using feeder 11. The said kiln reactor is preheated to a temperature above ignition temperature of the said carbonaceous material. The oxygen-bearing gases needed to ignite the said carbonaceous materials are introduced into the rotary kiln reactor 12 through the gas distributor 13 and more specifically using gas inlet pipes 109, 110, 111 and 112 shown in FIG. 2. The carbonaceous materials are introduced into the kiln reactor 12 at room temperature. Depending upon the speed of the rotation of the kiln reactor 12, the position of the overlay pipe 108 in FIG. 4, used for directing gas flow from ports 115, 116, 117, and 118 in FIG. 2 is adjusted using sprocket chain drives 408 and 409 in FIG. 5 so that the gas trajectories from the said gas ports adequately cover the solids layer 302, 303 or 304 shown in FIG. 4, as applicable. Best results for the pyrolysis of carbonaceous materials using this method is attained when oxygen-bearing gases are uniformly distributed within the four zones 103, 104, 105, and 106 shown in FIG. 2 of gas distributor 13. During the contact of solids with the gas in the rotary kiln reactor 12, the carbonaceous materials are partially combusted. The heat of combustion causes the temperature of the carbonaceous materials to rise to 800 deg F. to 1000 deg F. during which time the volatiles contained in the said carbonaceous materials evaporate into gas phase. The resulting mixture of gas is subsequently treated in the same manner as described for the first method.

The reactions involved in the second method include the following:

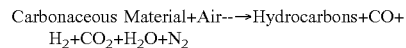

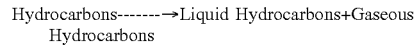

The solid residue discharged by the solids residue outlet port 113 from the rotary kiln reactor 12 contains inorganic components of the carbonaceous material as well as fixed carbon present in the said carbonaceous material. This solid residue has clean burning properties and therefore considered high-grade solid fuel.

When the carbonaceous material employed during the unit operation of the pyrolysis is a biomass, then the solid residue discharged from solids residue outlet port 113 constitutes production of bio-char.

When the intended use of the apparatus of this invention is to carry out the unit operation that entails gasification of the carbonaceous materials to produce clean gaseous fuel for utility use, the said unit operation for the process requires the that the said carbonaceous materials react with oxygen and water (vapor) at elevated temperature to convert carbonaceous material into a mixture of combustible and non-combustible gases. The carbonaceous material is introduced into the kiln reactor 12 using feeder 11. The said kiln reactor is pre-heated to a temperature above ignition temperature of the said carbonaceous material. The oxygen-bearing gases needed to ignite the said carbonaceous materials are introduced into the rotary kiln reactor 12 through the gas distributor 13 and more specifically using gas inlet pipes 109, 110, 111 and 112 shown in FIG. 2. The carbonaceous materials are introduced into the kiln reactor 12 at room temperature. The said carbonaceous materials require 20 to 50 percent water content for carrying out the intended unit operation of the gasification. If the said carbonaceous materials do not contain requisite water, in that case the additional water is introduced using water inlet port 102 in FIG. 2. Alternatively, steam is substituted for water either in water inlet port 102 or in one or all of the gas inlet ports 109, 110, 111, and 112. Depending upon the speed of the rotation of the kiln reactor 12, the position of the overlay pipe 108 in FIG. 4, used for directing gas flow from ports 115, 116, 117, and 118 in FIG. 2 is adjusted using sprocket chain drives 408 and 409 in FIG. 5 so that the gas trajectories from the said gas ports adequately cover the solids layer 302, 303 or 304 shown in FIG. 4, as applicable.

Upon entering the preheated kiln reactor 12, the small amount of volatile matter from the carbonaceous material is instantly vaporized. The preheat of the said kiln reactor is such that the volatile matter is at the flash point of combustion and is instantaneously ignited when contacted with air or with oxygen-bearing gases. For said unit operation of gasification, quantity of oxygen-bearing gases introduced along the length of the said kiln reactor is far below that is required for the complete combustion of the said carbonaceous materials. The quantity of oxygen bearing gases is generally in the range of 30 to 70 percent of that required for complete combustion. The chemical composition of the carbonaceous materials, the amount of moisture contained therein, and the intended temperature of the gasification reaction dictate this quantity of the said oxygen bearing gases.

During the unit operation of gasification, four distinct zones of gas-sold reactions are created along the length of the kiln reactor 12 and the corresponding temperature in each of the zone is resulted from partial combustion of vaporized volatile matter of the said carbonaceous materials and the gasification reactions between the vapors of water and carbonaceous materials. The said four zones are resulted from controlling the fraction of total oxygen bearing gases allowed to enter the kiln reactor 12 through the ports 115, 116, 117, and 118 of the zones 103, 104, 105, and 106 shown in FIG. 2.

In the first zone 103, which is closest to the entry of the carbonaceous material into the kiln reactor 12, the temperature is maintained below 800 deg F. so that the moisture contained in the carbonaceous material is evolved first followed by partial evaporation of the volatile matter. In said first zone, 10 to 25 percent of the oxygen-bearing gases are introduced through ports 115. In said first zone, the following reactions represent the interactions between the gas and solids:

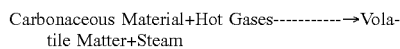

In the second zone 104, another 10 to 25 percent of the oxygen bearing gases are introduced through ports 116 to further combust the volatile matter which continues to vaporize. In this second zone, the temperature is allowed to rise to 1000 deg F. to 1200 deg F. The objective is to completely vaporize the volatile matter from the carbonaceous material.

In the third zone 105, another 25 to 40 percent oxygen-bearing gases are introduced and directed towards the carbonaceous material, by now devoid of volatile matter but comprising mainly of fixed carbon and inorganic components of the carbonaceous materials to fully combust the said fixed carbon therein. In this zone, the temperature is allowed to rise up to 1800 deg F. to 2000 deg F. in order to accelerate the combustion reaction. The heavy hydrocarbons and the combustible gases present inside of the kiln reactor 12 also combusts partially with the oxygen-bearing gas entering the said third zone. The vapors of water present in the gas inside the said kiln reactor also reacts with the said fixed carbon as well as with said heavy hydrocarbon molecules present in the vaporized volatile matter and causes these molecules to break down into smaller hydrocarbon molecules and combustible gases comprising mainly of carbon monoxide and hydrogen. In third zone 105, the main reactions are:

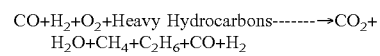

In the fourth zone 106 and subsequent zones (if any), the process conditions similar to the third zone 105 are maintained with respect to the temperature and with respect to the amount of the oxygen-bearing gases introduced through the ports 118 of zoned gas distributor 13.

For unit operations involving gasification of carbonaceous material, the gas mixture produced in the kiln reactor 12 does not require any additional treatment in the stage 2 reactor 14 and therefore the said gases are allowed to merely pass through the said stage 2 reactor. Upon entering the heat recovery heat exchangers 15, 16, 17, and 18 shown in FIG. 1, the said gases are cooled by indirect contact with water to 300 deg F. causing the large molecules of hydrocarbons present in the said gases to condense and collected in the condensate tanks 36, 37, 38, and/or 39 as applicable depending upon the number of heat recovery heat exchangers are deployed for cooling of the said hot gases from the kiln reactor 12. Depending upon the quantity of hot gases generated in the kiln reactor 12, only one or two of the said heat recovery heat exchangers would be utilized when the apparatus is used for the gasification of the carbonaceous material. The recovered heat is transformed into steam, which in turn is utilized for utility or for generating electricity using steam turbine 29 or for use for gasification. The majority of the gas mixture leaving the said heat recovery heat exchangers, comprising of small molecules of hydrocarbon, combustible gases, and non-combustible gases, are directed to the gas cleanup system 30 to remove particulates and precursors of greenhouse gases before it is either combusted in burner 31 and the hot gases from the said burner are directed to the remaining of the said heat recovery heat exchangers 15, 16, 17 and/or 18 to recover energy in the form of the steam or the said combustible gases are directed to the gas engine 40 to directly produce electricity. The cooled gases from the heat exchangers 15, 16, 17, and 18 and or from gas engine 40 are subsequently discharged to the flue gas outlet conduit.

The utility of the apparatus for the combustion of carbonaceous material with combustion air as is yet another application of the system for a commonly found unit operation at vast number of industrial applications. The apparatus of this invention allows for staged combustion of the carbonaceous materials using its ability to introduce combustion air in stages by utilizing four zones 103, 104, 105, and 106 through which the combustion air is introduced. The apparatus also allows conventional combustion of the said carbonaceous material by allowing introduction of all the combustion air using only first zone 103 of the gas distributor 13.

The carbonaceous material is introduced into the kiln reactor 12 using feeder 11. The said kiln reactor is preheated to a temperature above ignition temperature of the said carbonaceous material. The air needed to ignite the said carbonaceous materials is introduced into the rotary kiln reactor 12 through the gas distributor 13 and more specifically using gas inlet pipes 109, 110, 111 and 112 shown in FIG. 2 as applicable depending upon whether the apparatus is utilized for conventional combustion or for staged combustion. The said carbonaceous materials are introduced into the kiln reactor 12 at room temperature. Depending upon the speed of the rotation of the kiln reactor 12, the position of the overlay pipe 108 in FIG. 4, used for directing gas flow from ports 115, 116, 117, and 118 in FIG. 2 is adjusted using sprocket chain drives 408 and 409 in FIG. 5 so that the gas trajectories from the said gas ports adequately cover the solids layer 302, 303 or 304 shown in FIG. 4, as applicable.

During the combustion, the maximum temperature in the kiln reactor 12 is maintained between 1800 deg F. and 3000 deg F. by using excess air. The staged combustion allows the initial reaction between the vaporized volatile matter and oxygen under sub-stoichiometric conditions in the first zone 103 introducing a fraction of total combustion air through ports 115 so that the products of partial combustion are carbon monoxide and hydrogen in addition to water and carbon dioxide. The nitrogen present in the carbonaceous material is also vaporized and in the absence of adequate oxygen, the vaporized nitrogen remains as molecular nitrogen in the vaporized gases. In subsequent zones 104, 105, and 106, the fixed carbon of the carbonaceous materials as well as the gases generated from devolatalization of carbonaceous materials in the first zone 103 are further combusted with air entering the ports 116, 117, and 118. The combustion takes place in the presence of excess air over that required to completely combust the said carbonaceous materials. The main advantage of staged combustion is that the nitrogen present in the carbonaceous materials is evolved as elemental nitrogen rather than as oxides of nitrogen as is the case with conventional combustion.

The reactions associated with unit operation involving staged combustion are as follows:

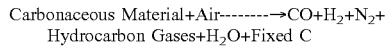
Carbonaceous Material+Air--------→$CO+H_2+N_2+$
Hydrocarbon Gases+$H_2O$+Fixed C

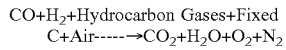
$CO+H_2$+Hydrocarbon Gases+Fixed
C+Air-----→$CO_2+H_2O+O_2+N_2$

The reaction associated with unit operation of the conventional combustion include:

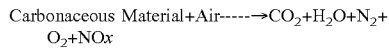
Carbonaceous Material+Air------→$CO_2+H_2O+N_2+$
$O_2$+NOx

For combustion related unit operations, the gas mixture produced in the kiln reactor 12 does not require any additional treatment in the stage 2 reactor 14 and therefore the said gases are allowed to merely pass through the said stage 2 reactor. Upon entering the heat recovery heat exchangers 15, 16, 17, and 18 shown in FIG. 1, the said gases are cooled by indirect contact with water to 300 deg F. The recovered heat is transformed into steam, which in turn is utilized for utility or for generating electricity using steam turbine 29. The gas mixture leaving the said heat recovery heat exchangers, comprising mainly carbon dioxide and water vapor are directed to the gas cleanup system 30 to remove particulates and precursors of greenhouse gases before the said gas mixture is discharged to the flue gas outlet conduit.

The utility of the apparatus of this invention for conducting unit operation for the remediation of hazardous waste is attained by activating the stage 2 reactor 14 in conjunction with the unit operation associated with pyrolysis, with gasification, and with combustion. In all of these unit operations, the organic contaminants are devolatilized from the hazardous waste in the kiln reactor 12 by processes already described. The gases containing hazardous organic contaminants are further treated in said stage 2 reactor by introducing additional oxygen bearing gases and if necessary additional fuel to increase the temperature of the said gases to above 2100 deg F. The volume of the gas entering said stage 2 reactor is maintained such that when the said gases pass through the said stage 2 reactor, the said gases have stayed in the said stage 2 reactor for a minimum of 2 seconds. The said temperature of 2100 deg F. and the said residence time of 2 seconds is necessary to break down molecules of organic contaminants into simple gas molecules of carbon monoxide, hydrogen, carbon dioxide, water vapor, nitrogen, hydrogen chloride, and hydrogen sulfide. Following the treatment of gases in said Stage 2 reactor, the gases are directed to the heat recovery heat exchangers 15, 16, 17, and/or 18 following which they are treated in the manner described above for unit operations of pyrolysis, gasification, and combustion.

The following examples illustrate the utility of the apparatus of the present invention in various unit operations relating to the physical and chemical reactions between the carbonaceous material and gases as well as to the thermo chemical transformation of carbonaceous materials. These examples are for illustrative purposes only and nothing in these examples are to be construed as limitations of the apparatus of this invention or to its applications.

EXAMPLES

Example 1

Drying of Carbonaceous Material

In this example, when the apparatus is exclusively utilized for drying of the carbonaceous material, the moisture bearing carbonaceous material is introduced in the rotary kiln reactor while the hot gases such as flue gases from the combustor exhaust is introduced into the gas distributor. For this unit operation, the hot gases are uniformly introduced into the reactor using the gas distributor. Each section of the distributor will introduce equal amounts of hot gases. The circumferential opening of the ports of the gas distributor will be in accordance with the speed of rotation of the rotary kiln and to the extent of rotary kiln circumferential coverage by the carbonaceous solids present in the kiln. The drying of the carbonaceous material takes place between 150 deg F. and 200 deg F. with hot gas entering the rotary kiln distributor at temperatures between 300 deg F. and 500 deg F. The gases leaving the reactor and entering the expanded section do not require additional treatment. Similarly, these gases do not require further cooling in the gas cooler and are then discharged.

The dry carbonaceous material is recovered at the discharge port for the residual solids.

Example 2

Pyrolysis of Carbonaceous Material

In this example, the apparatus is shown to achieve pyrolysis of the carbonaceous material by two methods. In pyrolysis of carbonaceous material, the volatile fraction of the carbonaceous material is separated from the fixed carbon and recovered as hydrocarbon liquids containing large hydrocarbon molecules or treated further with steam at elevated temperature to produce smaller hydrocarbon molecules.

In the first method, the carbonaceous material is introduced into the preheated rotary kiln. The heat in the preheated rotary kiln will cause some of the volatiles of the carbonaceous material to evolve. The oxidant in the form of air or as mixture with other gases is introduced into the first two sections of the gas distributor beginning with the section closest to the entry point of the carbonaceous material to cause the evolved volatiles to ignite only to the extent that the heat of that combustion maintains temperature of 800 deg F. to 1000 deg F. inside the kiln reactor. Maintaining this temperature along the selected length of the kiln is sufficient to evolve the entire volatile fraction of the carbonaceous material and to maintain the hydrocarbons of the volatile fraction in the vapor form. 50 percent to 80 percent of the oxidant will be introduced in the first section nearest to the materials entry point and the remainder will be introduced in the second section which follows the first section. The circumferential opening of the ports of the gas distributor will be in accordance with the speed of rotation of the rotary kiln and the extent of rotary kiln circumferential coverage by the carbonaceous solids present in the kiln. The vapors from the reactor will leave the reactor at 800 deg F. to 1000 deg F. If no further treatment of this vapors is required, these vapors will pass through the expanded section following the reactor and enter one or more sections of the gas cooler, also acting as a quencher, where the vapors will be cooled to below 300 deg F. using water as indirect cooling media. The water is converted to steam for utility or for production of electricity. When the vapors are cooled, the heavy hydrocarbons condense and separate from the vapors. The remaining vapors may contain smaller amounts of lighter hydrocarbons and other combustible gases. These vapors are cleaned by the gas cleanup unit to remove particulates, sulfur and chlorine compounds, and volatile metals. The clean vapors can then be combusted in the burner with air and the resulting hot flue gases are sent to the unused one or more sections of the gas cooler to recover sensible heat in the form of steam. Alternatively, the clean vapors can be combusted in the engine to produce electricity.

An additional treatment of the vapors exiting the reactor is also possible in the expanded section following the reactor. Here the vapors can be reacted further by introducing steam and oxidant whereby the temperature in the expanded section is increased to 1800 deg F. by allowing certain fraction of hydrocarbons present in the vapors to combust with oxidant. At this elevated temperature, the large molecular hydrocarbons present in the vapor reacts with steam and produces smaller molecular hydrocarbons along with other combustible gases. This treatment leaves in the vapor only trace quantities of heavy hydrocarbons. The treated vapors are cooled in one or more sections of the gas cooler where vapors are cooled to below 300 deg F. using water as indirect cooling media. The water is converted to steam for utility or for production of electricity. The vapors containing lighter hydrocarbons and other combustible gases are devoid of contaminants by the gas cleanup unit to remove particulates, sulfur and chlorine compounds, and volatile metals. The clean vapors can then be combusted in the burner with air and the resulting hot flue gases are sent to the unused one or more sections of the gas cooler to recover sensible heat in the form of steam. Alternatively, the clean vapors can be combusted in the engine to produce electricity.

In the second method the carbonaceous material is introduced into the preheated kiln reactor and the preheated gases at up to 2000 deg F. are introduced uniformly in the entire length of the rotary kiln reactor through all the sections of the gas distributor. The quantity of hot gases introduced in the kiln would be such that the carbonaceous material in the reactor attains temperature of 800 deg F. to 1000 deg F. sufficient to cause evolution of the entire fraction of volatile matter present in the carbonaceous material. The circumferential opening of the ports of the gas distributor will be in accordance with the speed of rotation of the rotary kiln and the extent of rotary kiln circumferential coverage by the carbonaceous solids present in the kiln. The volatile matter evolved through this hot treatment is comprised predominantly of heavy molecular hydrocarbons. The hot mixture of gases comprising gases introduced in the reactor and the products of evolution of volatile matter from the carbonaceous material exits the reactor at temperature between 800 deg F. and 1000 deg F. This mixture of gases can then be treated in the same manner as described above for the first method either to recover heavy hydrocarbons in the liquid form or converting them into lighter hydrocarbons and other combustible gases to use them for steam and or electricity.

The fraction of carbonaceous material comprising of fixed carbon and inorganic component of the carbonaceous material is recovered at the discharge port of the rotary kiln.

Example 3

Production of Bio-Char

In example 3, the carbonaceous material in example 2 is replaced with any biomass and processed in accordance with the dictates of that example. The resulting solid residue collected at the discharge port of the rotary kiln and comprising of fixed carbon and inorganic components of the said biomass constitutes the production of bio-char.

Example 4

Gasification of Carbonaceous Materials

The gasification of carbonaceous materials in example 4 is accomplished in the apparatus of this invention by first introducing carbonaceous material containing less than 40 percent moisture into the preheated rotary kiln followed by the introduction of various proportions of gas containing oxidant in different sections of the gas distributor. The total amount of oxidant introduced varies between 35 percent to 60 percent of stoichiometric oxidant required for complete combustion of the carbonaceous material; and this total oxidant stream is further distributed in various sections of the gas distributor to accomplish gas solid processing leading to complete gasification of the carbonaceous material. In the first section of the gas distributor, 10 to 25 percent of the total gas stream is introduced in order to ignite the fraction of volatile fraction of carbonaceous material evolved as a result of it entering the preheated rotary kiln. The heat released from this partial combustion is adequate to begin the process of drying the carbonaceous material as well as to evolve more of the volatile fraction of the carbonaceous material. The temperature of the kiln in the vicinity of the first section of the gas distributor will range from 300 deg F. to 800 deg F. In the successive section of the gas distributor, additional 10 to 25 percent of the oxidant gas stream is introduced to further combust the evolved volatile hydrocarbons of the carbonaceous material in order to increase the temperature of the kiln in the vicinity of the second section of the gas distributor to 800 deg F. to 1200 deg F. sufficient to evolve all of the volatile fraction from the carbonaceous solids. In the third successive section of the gas distributor, 30 to 50 percent of the oxidant bearing gas is introduced firstly to increase the temperature in that vicinity to 1400 deg F. to 2000 deg F. by burning the fraction of hydrocarbons present in the vapors generated from devolatalization of the carbonaceous material; secondly to react the devolatalized vapors containing heavy hydrocarbons with steam produced from drying of the carbonaceous materials in the first section in order to convert heavy hydrocarbon molecules into smaller hydrocarbon molecules and other combustible gases; and thirdly to initiate chemical reaction between the fixed carbon remaining in the carbonaceous material following the devolatalization in order to convert that carbon into combustible and noncombustible gases. The successive fourth and the balance of the gas distributor sections receive the remainder of the oxidant bearing gases for maintaining temperature of 1400 deg F. to 2000 deg F. in those vicinities and to further cause the fixed carbon reactions to convert all the residual carbon into combustible and noncombustible gases. It is also in this section that the combustible gases including carbon monoxide and hydrogen and noncombustible gases including carbon dioxide and steam attain equilibrium state in conformity with equilibrium value, which is dictated by the temperature in that last section of the rotary kiln. Because of subjecting the gases to the high temperatures in the presence of steam, only traces of heavy hydrocarbon molecules survive in the resulting gas mixture. Nearly all of the heavy hydrocarbon molecules break down into smaller hydrocarbon molecules such as methane and ethane and also into other combustible gases including carbon monoxide and hydrogen. The mixture of these gases collectively is termed as synthesis gas or syngas. The collective gas mixture also constitutes a gaseous fuel that can be used as substitute for hydrocarbon fuels as well as for coal for the production of steam and or electricity. The circumferential opening of the ports of the gas distributor will be in accordance with the speed of rotation of the rotary kiln and the extent of rotary kiln circumferential coverage by the carbonaceous solids present in the kiln.

Since the heavy hydrocarbon molecules already react with steam in the kiln at elevated temperature and since only trace quantity of these molecules remain in the gas emanating from the reactor, it is not necessary to treat it any further in the expanded section following the reactor. It simply passes through the expanded section and enters into one or more sections of the gas cooler where it is cooled to below 300 deg F. using water as indirect cooling media. The water is converted to steam for utility or for production of electricity. The cooled gas is then cleaned by the gas cleanup unit to remove particulates, sulfur and chlorine compounds, and volatile metals. The clean fuel gas can then be combusted in the burner with air and the resulting hot flue gases are sent to the unused one or more sections of the gas cooler to recover sensible heat in the form of steam. Alternatively, the clean fuel gas can be combusted in the engine to produce electricity.

The inorganic portion of the carbonaceous material is recovered at the discharge port of the rotary kiln.

Example 5

Staged Combustion of Carbonaceous Material

In example 5, the carbonaceous material is combusted stage wise in the apparatus of this invention in order to avoid production of oxides of nitrogen from the nitrogen bound with the carbonaceous material.

The carbonaceous material is introduced into the preheated rotating kiln reactor. The 40 to 50 percent of the stoichiometric air required for the complete combustion of the carbonaceous material is then introduced into the first section of the gas distributor, which is closest to the point of introduction of carbonaceous material into the reactor. Additional 40 to 50 percent of the stoichiometric air is introduced into the second successive section of the gas distributor and the remaining 10 to 20 percent of the stoichiometric air is introduced into the third successive section of the gas distributor. In distributing the air in the manner described, the partial combustion of the carbonaceous material is initiated in the rotary kiln reactor in the vicinity of the first section through the ignition of the volatile matter evolved from the carbonaceous material resulting from heat transfer from the preheated rotary kiln. The partial combustion of the carbonaceous material continues in the rotary kiln in the vicinity of the second section of the gas distributor. Because of only introducing less than stoichiometric amount of air required for the total combustion, the fraction of carbon through its reaction with air and moisture present in the carbonaceous material converts into carbon monoxide and hydrogen thereby creating reducing environment in the reactor in the vicinity of these first two sections of the gas distributor. The circumferential opening of the ports of the gas distributor will be in accordance with the speed of rotation of the rotary kiln and the extent of rotary kiln circumferential coverage by the carbonaceous solids present in the kiln.

Because of creating the reducing environment devoid of excess oxygen, the nitrogen bound in the carbonaceous material is released as elemental nitrogen instead of oxides of nitrogen as would be the case if the carbonaceous material were combusted in the presence of excess air. Once the nitrogen is released as elemental nitrogen, it has less propensity to convert into the oxides of nitrogen during subsequent exposure with oxygen.

The combustion of carbonaceous material is completed by introducing 20 to 30 percent of the stoichiometric air in the third successive section of the gas distributor. Any excess air required to reduce the overall temperature of the flue is introduced in the fourth and any additional successive sections of the gas distributor. Generally, the gas is tempered to 1800 deg F. before it exits the reactor.

In case of partial combustion of carbonaceous material, the flue gases passes through the expanded section of the secondary reactor without any additional treatment and enters one or more sections of the gas cooler where it is cooled to 300 deg F. The heat from the flue gas is recovered in the form of steam which can then be used for utility purposes or for generating electricity.

The cooled flue gas is passed through the gas cleanup unit and ejected from the system.

Example 6

Conventional Combustion of Carbonaceous Material

In example 6, the carbonaceous material is combusted in the apparatus of this invention in the conventional mode in which the carbonaceous material and air are introduced simultaneously into the combustion apparatus.

The carbonaceous material is introduced into the preheated rotating kiln reactor. 100 to 120 percent of the stoichiometric air required for the complete combustion of the carbonaceous material is introduced into the first section of the gas distributor which is closest to the entry point of carbonaceous material into the reactor. The circumferential opening of the ports of the gas distributor will be in accordance with the speed of rotation of the rotary kiln and the extent of rotary kiln circumferential coverage by the carbonaceous solids present in the kiln. Any excess air required to reduce the overall temperature of the flue is introduced in the second and more successive sections of the gas distributor. Generally, the gas is tempered to 1800 deg F. before it exits the reactor.

In case of the conventional combustion of carbonaceous material, the flue gases passes through the expanded section of the secondary reactor without any additional treatment and enters one or more sections of the gas cooler where it is cooled to 300 deg F. The heat from the flue gas is recovered in the form of steam which can then be used for utility purposes or for generating electricity.

The cooled flue gas is passed through the gas cleanup unit and ejected from the system.

Example 7

Remediation of Hazardous Waste

In example 7, the hazardous waste comprising sediment and trace quantities of polychlorinated biphenyl (PCB) is treated to first remove the trace PCB from the sediment and subsequently destructing the PCB.

The PCB contaminated sediment is introduced into the rotating kiln reactor. The hot gases at 2800 to 3000 deg F. containing small fraction, 5 to 10 percent oxygen, are introduced uniformly along the length of the reactor through the gas distributor. Equal quantity of hot gas is introduced in each of the sections of the gas distributor. If the distributor comprises of four sections, then 25% of the total gas is introduced in each of the section of the gas distributor. The total quantity of the gas is such that after exposing the gas to the contaminated sediment, the sediment attains the temperature of 1800 deg F. and the gas leaving the reactor also maintains the same temperature. Raising the sediment temperature to 1800 deg F. is sufficient to desorb all the organic matter including PCB from the sediment. The circumferential opening of the ports of the gas distributor will be in accordance with the speed of rotation of the rotary kiln and the extent of rotary kiln circumferential coverage by the carbonaceous solids present in the kiln. The presence of oxygen in the hot gases entering the reactor through the gas distributor is sufficient to combust the organics including PCB's.

The remediated sediment is recovered from the discharge port of the rotary kiln reactor.

The exiting gas, according to the regulatory protocol, would require additional treatment, which is rendered in the expanded section, also acting as secondary reactor. Additional air and fuel are introduced into the secondary reactor in order to increase the temperature of the entering gases to a minimum of 2100 deg F. and to provide requisite 2 seconds residence time before the gas is sent to the gas cooler. This increase in temperature and allowing the temperature to sustain for minimum of 2 seconds assures near complete destruction of all the organic compounds that survives in the rotary kiln reactor.

The gases are then cooled by the gas cooler where the heat is recovered in the form of steam, which can be either used for utility purposes or for generating electricity.

The proportions of gases that are required for carrying out various unit operations described in these examples are indicated in Table 1. The gas distributor plays a key role in achieving these requisite gas distributions.

TABLE 1

Unit Operation And Related Gas Distribution Within The Rotary Kiln Reactor

| Unit Operation | Maximum Temperature Inside The Rotary Kiln Reactor | Gas Distribution | | | | Secondary Reactor |
|---|---|---|---|---|---|---|
| | | Section 1 (Closest to Entry of Carbonaceous Material into the Reactor) | Section 2 (Successive to Section 1) | Section 3 (Successive to Section 2) | Section 4 (Successive to Section 3) | |
| Drying of Carbonaceous Materials | 150 to 200 deg F. | 0-25% hot gases | 0-25% hot gases | 0-25% hot gases | 0-25% hot gases | |
| Pyrolysis of Carbonaceous Materials and Production of Biochar | 800-1000 deg F. | 50 to 80% of total oxidant. Alternatively 50 to 80% hot gases | 20 to 50% of total oxidant. Alternatively 0 to 50% hot gases | 0 | 0 | 0 |
| Gasification of Carbonaceous Materials | 1400 to 2000 deg F. | 10-25% of total oxidant | 10 to 25% of total oxidant | 30 to 50% of total oxidant | 0-50% of total oxidant | 0 |

TABLE 1-continued

Unit Operation And Related Gas Distribution Within The Rotary Kiln Reactor

| Unit Operation | Maximum Temperature Inside The Rotary Kiln Reactor | Gas Distribution | | | | Secondary Reactor |
|---|---|---|---|---|---|---|
| | | Section 1 (Closest to Entry of Carbonaceous Material into the Reactor) | Section 2 (Successive to Section 1) | Section 3 (Successive to Section 2) | Section 4 (Successive to Section 3) | |
| Staged Combustion of Carbonaceous Materials | 1800 to 2000 deg F. | 40-50% of air | 40 to 50% of air | 20 to 30% of air | 50 to 100% air for cooling flue gas | 0 |
| Conventional Combustion of Carbonaceous Materials | 1800 to 2000 deg F. | 100-110% of air | 0% of air | 0% of air | 50 to 100% air for cooling flue gas | 0 |
| Destruction Of Hazardous Carbonaceous Materials | 1800 to 2000 deg F. | 25% of hot gases | 25% of hot gases | 25% of hot gases | 25% of hot gases | Excess fuel and air/$O_2$ to increase gas temperature to 2100 deg F. |
| | 800-1000 deg F. | 50 to 80% of total oxidant. Alternatively 50 to 80% hot gases | 20 to 50% of total oxidant. Alternatively 0 to 50% hot gases | 0 | 0 | 0 |

The amounts of gas inputs for various unit operations cited in the above examples are summarized in Table 2 using wood as carbonaceous material. These values are based on processing 1 ton of said carbonaceous material for the unit operations indicated as well as the amount of total gas generated during these operations using the apparatus of this invention.

TABLE 2

Amounts of Gases Associated With Unit Operations Using Wood

| Unit Operation | Amount of Carbonaceous Material Introduced | Amount of Oxidant Stream Introduced | Amount of Hot Gases Introduced Into Rotary Kiln Reactor | Amount of Gases Introduced Into Secondary Reactor | Total Amount Of Gas Produced | Total Amount of Solids Produced |
|---|---|---|---|---|---|---|
| Drying of Carbonaceous Material | 1 ton containing 50% moisture and dried to 10% moisture | | 14497 lbs of hot gases at 500 deg F. | 0 | 15385 lbs at 180 deg F. | 1112 Lbs of dry solids at 180 deg F. |
| Pyrolysis of Carbonaceous Material | Case 1. 1 ton containing 20% moisture | 3230 lbs of air | 0 | 0 | 4837 lbs at 1000 deg F. | 393 lbs of biochar at 1000 deg F. |
| | Case 2: 1 ton containing 20% moisture | 0 | 3102 lbs of hot gases at 2000 deg F. | 0 | 4716 lbs at 1000 deg F. | 393 lbs of biochar at 1000 deg F. |
| Gasification of Carbonaceous Material | 1 ton containing 20% moisture | 5048 lbs of air | 0 | 0 | 6987 lbs at 1800 deg F. | |
| Staged Combustion of Carbonaceous Material | 1 ton containing 20% moisture | 24371 lbs of air (9639 lbs for stoichiometric combustion and balance for reducing flue gas temperature) | 0 | 0 | 26097 lbs at 1800 deg F. | |

TABLE 2-continued

Amounts of Gases Associated With Unit Operations Using Wood

| Unit Operation | Amount of Carbonaceous Material Introduced | Amount of Oxidant Stream Introduced | Amount of Hot Gases Introduced Into Rotary Kiln Reactor | Amount of Gases Introduced Into Secondary Reactor | Total Amount Of Gas Produced | Total Amount of Solids Produced |
|---|---|---|---|---|---|---|
| Conventional Combustion of Carbonaceous Material | 1 ton containing 20% moisture | 24371 lbs of air (9639 lbs for stoichiometric combustion and balance for reducing flue gas temperature) | 0 | 0 | 26097 lbs at 1800 deg F. | |
| Hazardous Waste Destruction | 1 ton contaminated sediment with trace amounts of hydrocarbons | 0 | 1743 lbs at 2400 deg F. to increase hydrocarbon-carrying solids temperature to 1800 deg F. | 176 lbs containing natural gas and air | 1919 lbs at 2100 deg F. | 1 ton of decontaminated sediment at 1800 deg F. |
| Biochar Production From Biomass | Same as pyrolysis case above | | | | | |

The examples of applications stated herein are not to be construed as limitation of the apparatus. The apparatus has wide applications in virtually all the industries including but not limited to metals processing, metallurgy, power generation from fossil fuel, power generation from biomass, chemical processing, incineration, and in all industries where unit operations involving physical and chemical reactions between gases and gases, gases and liquids, and gases and solids are part of normal operations.

While in the foregoing specification, this invention has been described in relation to certain preferred embodiments thereof, and many details have been set forth for purpose of illustration, it will be apparent to those skilled in the art that the invention is susceptible to additional embodiments and that certain of the details described therein can be varied considerably without departing from the basic principles of the invention.

Those skilled in the art will recognize, or be able to ascertain using no more than routine experimentation, many equivalents to the specific embodiments of the invention specifically described herein.

I claim:

1. A common purpose apparatus system in which physical and chemical reactions of carbonaceous materials with oxygen bearing gases and preheated gases are carried out; thermo chemical transformation of carbonaceous materials into gaseous and liquid fuels is carried out; carbonaceous fuels are combusted and energy there from is recovered; hydrocarbon-contaminated materials are remediated; and bio-chars from biomass are produced, comprising:
   a rotary kiln reactor,
   a feeder to introduce carbonaceous materials into the rotary kiln reactor,
   a port for introducing carbonaceous material at a front end of the rotary kiln reactor,
   an exit port for removal of solids at a far end of the rotary kiln reactor,
   a stationary gas distributor positioned inside the rotary kiln reactor,
   a Stage 2 reactor following the rotary kiln reactor,
   an apparatus in which oxygen-bearing gases are introduced into the stationary gas distributor,
   an apparatus in which a direction of gas from the stationary gas distributor is controlled,
   an apparatus in which water and liquid carbonaceous materials are introduced into the rotary kiln reactor,
   an apparatus in which fuel, steam, and oxygen-bearing gases are introduced into the Stage 2 reactor,
   an indirect gas cooler in which gases generated from the Stage reactor are cooled resulting in cooled gases and in which heat from the gases being cooled is recovered in the form of steam,
   a liquid condensate collector to recover hydrocarbon liquids from the cooled gases,
   an apparatus in which the cooled gases are cleaned to remove particulates and agents of greenhouse gases,
   a burner in which combustible gases are combusted, wherein hot gases are generated from reaction of combustible gases with oxygen-bearing gases,
   a steam turbine to generate electricity from steam, and
   a gas engine to generate electricity from combustible gases.

2. The common purpose apparatus system according to claim 1, wherein dimensions of the rotary kiln reactor are such that its length is 3 to 8 times larger than its diameter.

3. The common purpose apparatus system according to claim 1, wherein the rotary kiln reactor maintains a downward slope between 5 degrees to 15 degrees, a point of exit of solids material being located on a low end of a slope.

4. The common purpose apparatus system according to claim 1, wherein the stationary gas distributor is tubular.

5. The common purpose apparatus system according to claim 4, wherein the stationary gas distributor is divided into four or more horizontal sections by fixed partitions located inside a tubular pipe.

6. The common purpose apparatus system according to claim 1, wherein the stationary gas distributor is comprised of an inner tube and an outer tube.

7. The common purpose apparatus system according to claim 6, wherein the inner tube constitutes a gas distributor and the outer tube constitutes a device for controlling a direction of the gas introduced by the gas distributor.

8. The common purpose apparatus system according to claim 6, wherein the outer tube is free to rotate over the inner tube.

9. The common purpose apparatus system according to claim 1, wherein the stationary gas distributor is supplied with oxygen-bearing gases as well as preheated gases, wherein the introduction of said oxygen-bearing and preheated gases is controlled independently of one another.

10. The common purpose apparatus system according to claim 1, wherein the stationary gas distributor is provided with a multiplicity of ports in communication with an inside of the rotary kiln reactor.

11. The common purpose apparatus system according to claim 10, wherein ports cover one half of a circumference of the stationary gas distributor.

12. The common purpose apparatus system according to claim 10, wherein the multiplicity of ports on the stationary gas distributor are uniform with respect to diameter.

13. The common purpose apparatus system according to claim 10, wherein multiplicity of the ports on the stationary gas distributor are of differing sizes with respect to diameter.

14. The common purpose apparatus system according to claim 1, wherein the stationary gas distributor is positioned to communicate directly with the solids present on a wall of the rotary kiln reactor.

15. The common purpose apparatus system according to claim 1, wherein the stationary gas distributor is supported by stationary hoods of the rotary kiln reactor.

16. The common purpose apparatus system according to claim 1, wherein the stationary gas distributor is divided evenly into four of more sections.

17. The common purpose apparatus system according to claim 1, wherein the stationary gas distributor is divided unevenly.

18. The common purpose apparatus system according to claim 1, wherein an amount of gas flowing through each of a section of the stationary gas distributor varies from 0 to 100 percent of a total gas introduced into the rotary kiln reactor.

19. The common purpose apparatus system according to claim 1, wherein a direction of discharge of gas from the stationary gas distributor is controlled according to rotation of the rotary kiln reactor in order to fully communicate with altering position of solids confined on a wall of the rotary kiln reactor.

20. The common purpose apparatus system according to claim 1, wherein a direction of gas flow from the stationary gas distributor is controlled by a second tubular pipe surrounding a gas distributor pipe.

21. The common purpose apparatus system according to claim 1, wherein an outer pipe for gas control and an inner pipe for gas distribution are concentric.

22. The common purpose apparatus system according to claim 21, wherein the outer pipe of the stationary gas distributor is cut along an entire length of portion exposed to inside of the rotary kiln reactor extending to one half of circumference such that a cut out area completely exposes all ports of an inner pipe comprising the stationary gas distributor.

23. The common purpose apparatus system according to claim 21, wherein a position of the outer pipe is controlled from outside of the rotary kiln reactor with a rotation mechanism.

24. The common purpose apparatus system according to claim 1, wherein the Stage 2 reactor is fluidized bed, entrained bed, fixed bed, moving bed, cyclonic reactor, or rotating kiln reactor.

25. The common purpose apparatus system according to claim 1, wherein the Stage 2 reactor is catalytic.

26. The common purpose apparatus system according to claim 1, wherein fuel, air, and steam are injected with a multiplicity of gas entry ports into the Stage 2 reactor.

27. The common purpose apparatus system according to claim 1, wherein the indirect gas cooler indirectly cools the gas with water.

28. The common purpose apparatus system according to claim 27, wherein the water is converted into steam.

29. The common purpose apparatus system according to claim 28, wherein the steam is converted into electricity.

30. The common purpose apparatus system according to claim 1, wherein the indirect gas cooler comprises two or more gas coolers.

31. The common purpose apparatus system according to claim 1, wherein the indirect gas cooler recovers heat from gases emanating from the said Stage 2 reactor.

32. The common purpose apparatus system according to claim 1, wherein the cooled gases are combusted by the burner.

33. The common purpose apparatus system according to claim 32, wherein said burner is coupled with gas coolers.

34. The common purpose apparatus system according to claim 1, wherein the indirect gas cooler recovers heat from the gas discharged from the burner.

35. The common purpose apparatus system according to claim 1, wherein the hydrocarbon liquids are condensed in the indirect gas coolers.

36. The common purpose apparatus system according to claim 1, wherein the cooled gases are combusted in the gas engine to generate electricity.

* * * * *